US008966461B2

(12) United States Patent
Gaster et al.

(10) Patent No.: US 8,966,461 B2
(45) Date of Patent: Feb. 24, 2015

(54) VECTOR WIDTH-AWARE SYNCHRONIZATION-ELISION FOR VECTOR PROCESSORS

(75) Inventors: Benedict R. Gaster, Santa Cruz, CA (US); Lee W. Howes, Austin, TX (US); Mark D. Hummel, Franklin, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 112 days.

(21) Appl. No.: 13/249,171

(22) Filed: Sep. 29, 2011

(65) Prior Publication Data

US 2013/0086566 A1    Apr. 4, 2013

(51) Int. Cl.
| | | |
|---|---|---|
| G06F 17/00 | (2006.01) |
| G06J 1/00 | (2006.01) |
| G06F 7/52 | (2006.01) |
| G06F 13/00 | (2006.01) |
| G06F 13/28 | (2006.01) |
| G06F 15/00 | (2006.01) |
| G06F 9/44 | (2006.01) |
| G06F 9/45 | (2006.01) |
| G06F 9/46 | (2006.01) |
| G06F 9/455 | (2006.01) |

(52) U.S. Cl.
CPC ............ G06F 8/443 (2013.01); G06F 9/45525 (2013.01)
USPC ............... 717/148; 706/46; 708/3; 708/607; 711/141; 712/10; 712/30; 712/202; 712/220; 712/226; 717/106; 717/115; 717/116; 717/120; 717/126; 717/136; 717/140; 717/141; 717/149; 717/159; 717/160; 717/175; 718/100; 718/102

(58) Field of Classification Search
CPC ............. G06F 8/34; G06F 8/45; G06F 8/314; G06F 8/443; G06F 9/526; G06F 9/3016; G06F 9/30036; G06F 11/2294; G06F 11/2733
See application file for complete search history.

(56) References Cited

U.S. PATENT DOCUMENTS

| | | | | |
|---|---|---|---|---|
| 5,261,067 A | * | 11/1993 | Whelan | 711/141 |
| 5,293,631 A | | 3/1994 | Rau et al. | |
| 6,487,716 B1 | * | 11/2002 | Choi et al. | 717/159 |
| 6,598,225 B1 | * | 7/2003 | Curtis et al. | 717/175 |
| 6,766,515 B1 | * | 7/2004 | Bitar et al. | 718/100 |
| 7,543,119 B2 | | 6/2009 | Hessel et al. | |
| 8,225,297 B2 | * | 7/2012 | Gray et al. | 717/141 |
| 2003/0115230 A1 | * | 6/2003 | Walster et al. | 708/3 |
| 2004/0193841 A1 | * | 9/2004 | Nakanishi | 712/10 |
| 2005/0172265 A1 | * | 8/2005 | Brigham et al. | 717/120 |
| 2006/0112049 A1 | * | 5/2006 | Mehrotra et al. | 706/46 |
| 2007/0124722 A1 | * | 5/2007 | Gschwind | 717/106 |
| 2007/0169042 A1 | * | 7/2007 | Janczewski | 717/149 |
| 2008/0127059 A1 | | 5/2008 | Eichenberger et al. | |
| 2008/0141012 A1 | * | 6/2008 | Yehia et al. | 712/226 |
| 2008/0288750 A1 | * | 11/2008 | Clift et al. | 712/202 |

(Continued)

Primary Examiner — Don Wong
Assistant Examiner — Anibal Rivera
(74) Attorney, Agent, or Firm — Meyertons, Hood, Kivlin, Kowert & Goetzel, P.C.

(57) ABSTRACT

A medium, method, and apparatus are disclosed for eliding superfluous function invocations in a vector-processing environment. A compiler receives program code comprising a width-contingent invocation of a function. The compiler creates a width-specific executable version of the program code by determining a vector width of a target computer system and omitting the function from the width-specific executable if the vector width meets one or more criteria. For example, the compiler may omit the function call if the vector width is greater than a minimum size.

16 Claims, 7 Drawing Sheets

(56) References Cited

U.S. PATENT DOCUMENTS

| | | |
|---|---|---|
| 2008/0288754 A1 | 11/2008 | Gonion et al. |
| 2009/0077545 A1* | 3/2009 | Silvera et al. .................. 717/160 |
| 2009/0089542 A1* | 4/2009 | Laine et al. ...................... 712/30 |
| 2009/0113185 A1* | 4/2009 | Hansen et al. ................. 712/220 |
| 2009/0259997 A1* | 10/2009 | Grover et al. .................. 717/136 |
| 2009/0300323 A1 | 12/2009 | Hessel et al. |
| 2010/0088680 A1* | 4/2010 | Ganai et al. .................... 717/126 |
| 2010/0146482 A1* | 6/2010 | Holtz et al. .................... 717/116 |
| 2011/0035728 A1* | 2/2011 | Janczewski .................... 717/116 |
| 2011/0047533 A1* | 2/2011 | Gschwind ...................... 717/140 |
| 2011/0067016 A1* | 3/2011 | Mizrachi et al. ............... 717/149 |
| 2011/0072412 A1* | 3/2011 | Hasslen et al. ................. 717/106 |
| 2011/0078226 A1* | 3/2011 | Baskaran et al. .............. 708/607 |
| 2012/0084750 A1* | 4/2012 | Hardy et al. ................... 717/115 |
| 2013/0042248 A1* | 2/2013 | Gargash ........................ 718/102 |

\* cited by examiner

VECTOR WIDTH-AWARE SYNCHRONIZATION-ELISION FOR VECTOR PROCESSORS

BACKGROUND

To increase the speed of computations, computer systems often employ some form of parallel processing, such as multiprocessing or vector processing. For example, multiprocessing systems require that the programmer break a computation into multiple tasks that are executed in parallel by different processors. Because each processor executes a separate instruction stream on separate data, multiprocessors are traditionally characterized as utilizing a multiple-instruction, multiple-data (MIMD) model. In contrast to multiprocessing, vector processing often requires that a programmer break the computation's data into arrays (single or multidimensional) and instruct the system to execute a single instruction on multiple elements of the array in parallel. For this reason, vector processing is traditionally characterized as utilizing a single-instruction, multiple-data (SIMD) model.

Vector processing (also known as array processing) often requires that the programmer encode a program using a vector-programming language and execute the program on a vector-processing system. A vector processing system may be implemented in different configurations and may include different numbers and/or types of processors. For example, a vector processing system may include one or more vector processors, such as graphics processing units (GPUs), each capable of concurrently executing an instruction on multiple data. A vector processing system may additionally or alternatively include one or more scalar processors/cores configured to implement vector processing collectively.

In a vector processing programming model, the programmer may create a data structure that contains multiple data elements (e.g., an array of numbers) and write a single instruction that instructs the system to perform the same operation on each of the data elements in parallel. For example, the programmer may create two 64-element arrays, and, using a single add instruction, instruct the vector processing system to add the corresponding elements of the two arrays. The programming model does not require that the programmer use loops to iterate over each element, nor does it generally require that the programmer encode explicit communications between different threads of execution and/or processing elements. Instead, communication and synchronization is taken care of transparently, such as through hardware constructs and/or shared memory regions. The number of elements on which the system may operate in parallel is referred to as the system's vector width.

SUMMARY OF EMBODIMENTS

A medium, method, and apparatus are disclosed for eliding superfluous function invocations in a vector-processing environment. A compiler, such as a just-in-time compiler, receives program code comprising a width-contingent invocation of a function. The compiler creates a width-specific executable version of the program code by determining a vector width of a target computer system and omitting the function from the width-specific executable if the vector width meets one or more criteria. For example, the compiler may omit the function call if the vector width is greater than a minimum size. In some embodiments, the function invocation may specify the minimum size.

In some embodiments, a vector processor itself may be configured to elide a function call in response to determining that the function call is superfluous. Determining that the function call is superfluous may be based on a vector width of the processor. For example, the function invocation may be superfluous if the vector processor has a vector width greater than a minimum width. The minimum width may be specified as part of the function invocation.

In some embodiments, the omitted or elided function invocation may correspond to a synchronization operation, such as a barrier operation.

DETAILED DESCRIPTION

Figure 1:
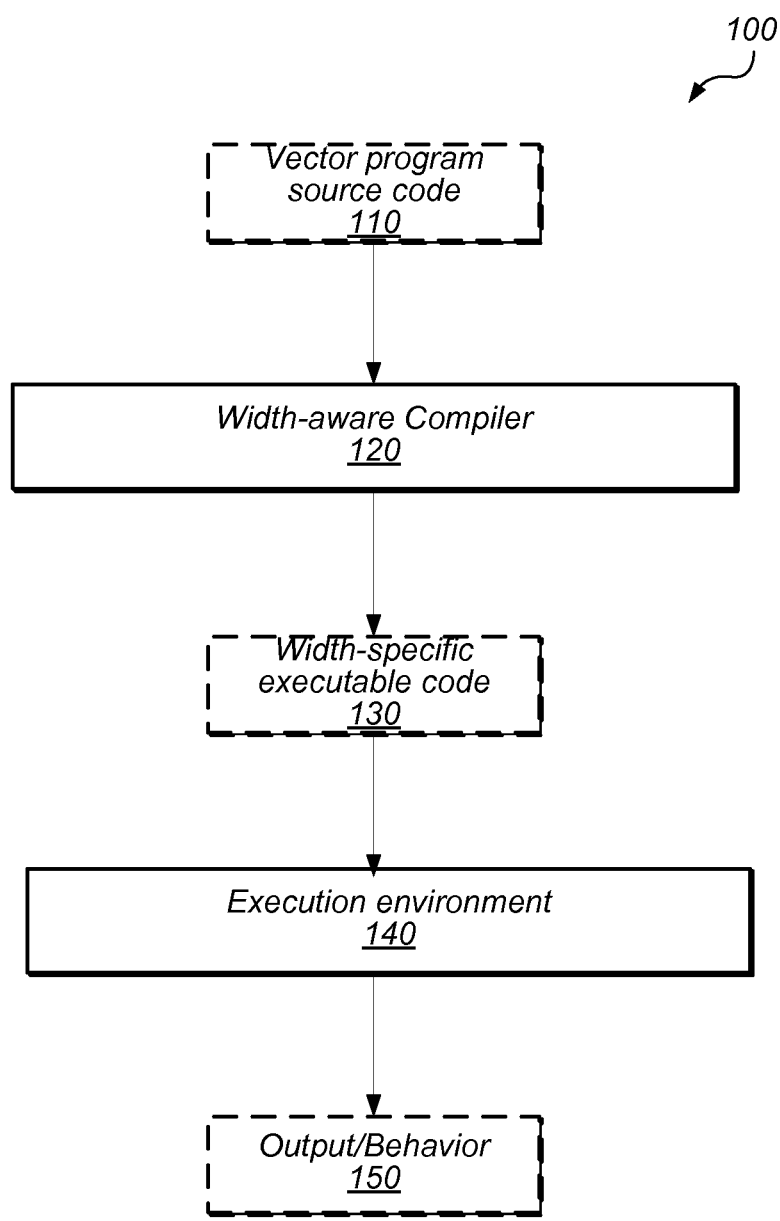
FIG. 1 illustrates a workflow for compiling and executing a vector computer program specified in a high-level language using a vector-programming model, according to various embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware— for example, circuits, memory storing program instructions executable to implement the operation, etc. Reciting that a unit/circuit/component is "configured to" perform one or more tasks is expressly intended not to invoke 25 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a processor having eight processing elements or cores, the terms "first" and "second" processing elements can be used to refer to any two of the eight processing elements. In other words, the "first" and "second" processing elements are not limited to logical processing elements 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Different vector processing systems may implement parallel execution differently. For example, some systems (e.g., GPUs) may use separate threads to achieve parallel execution. When adding the elements of two 64-element arrays, such a system might use a different thread for each of the 64 indices, where each thread may correspond to its own thread context. In other systems, parallel operations may be executed by different hardware lanes of a vector processor, which may not require separate threads with separate thread contexts.

Because different systems may implement parallel work using different mechanisms, this disclosure generalizes a parallel execution as a "work item," adopting the terminology of the OpenCL vector programming language. Therefore, a parallel addition of two 64-element arrays utilizes 64 work items, regardless of whether those work items are implemented using separate threads, vector lanes, and/or using other mechanisms.

The number of work items that a vector processor can execute in parallel is referred to herein as the vector width of the processor. For example, a vector processor with a vector width of 64 can add the elements of two 64-element arrays using a single instruction. Such a processor may include 64 hardware lanes, which together can concurrently execute the same instruction on different data elements (i.e., same-instruction, multiple-data).

The transparency of a vector processing programming model may cause difficulty when porting programs to systems with different vector widths. For example, a function written to take advantage of one vector width may perform sub-optimally or incorrectly when executed on a system with a different vector width. To write code that executes correctly on different vector widths, programmers are often forced to write inefficient code that may not be structured to take advantage of larger vector widths, may include superfluous function calls and/or communications (e.g., barrier operations), and/or may implement complex and unnecessary state consistency enforcement.

According to various embodiments, a compiler may be configured to provide functionality that facilitates vector program deployment on systems with different vector widths. In some embodiments, the compiler may be configured to detect a system's vector width and to compile vector programs to take advantage of that information. For example, in some embodiments, the compiler may automatically select a version of a function that is targeted towards the system vector width. In another example, the compiler may automatically enforce concurrency guarantees, which may depend on the vector width. In yet another example, the compiler may utilize knowledge of the vector width to automatically elide superfluous function calls, such as synchronization operations (e.g., barriers) when the vector width does not require them. Such techniques may be referred to herein as width-aware compilation.

The compiler may utilize various hints from the programmer to compile the vector programs. For example, a programmer may mark a given function call in a manner indicating that the compiler should select an appropriate width-specific function or that the compiler should make various concurrency guarantees (e.g., if one work item executes a function, all work items in a given sized work group will also execute the function). In another example, the programmer may mark a function (e.g., barrier operation) with an indication that the function may be elided (i.e., not executed) if the vector width meets a certain minimum threshold.

FIG. 1 illustrates a workflow for compiling and executing a vector computer program specified in a high-level language using a vector programming model, according to various embodiments. In FIG. 1, solid outlines indicate operational components 120 and 140 while dashed outlines (e.g., 110, 130, and 150) indicate data passed between these components.

According to the illustrated embodiment, the workflow begins when a width-aware compiler, such as 120, receives source code for a vector computer program, such as 110. In various embodiments, source code 110 may be specified in various high-level programming languages, such as C, C++, OpenCL, etc. In some embodiments, the programming language may correspond to a graphics programming language (e.g., GPL, OpenGL, etc.) and/or may include special-purpose vector-programming functions/libraries. In some embodiments, source code 110 may be specified using a combination of languages, which may include one or more low-level and/or intermediate languages (e.g., assembly).

According to the illustrated embodiment, compiler 120 may compile source code 110 into an executable version, such as 130. In various embodiments, executable code 130 may be encoded in a binary machine language, an interpreted intermediate language (e.g., byte-code), and/or in other various executable formats. In some instances, different parts of the executable code 130 may be encoded in different formats.

As part of compiling program source code 110 into width-specific executable code 130, compiler 120 may determine the vector width of the target machine and/or detect various width-related hints in source code 110, as discussed below. For example, the hints may include indications that the compiler may choose between multiple width-specific functions, may elide various synchronization primitives when the vector width is above a given minimum, that the compiler must guarantee some concurrency conditions, and/or other hints. The compiler may use the detected vector width and hints to compile width-specific executable code 130, which is optimized for the detected width.

As illustrated in FIG. 1, width-specific executable code 130 may be executed in an execution environment, such as 140, which executes the code, resulting in various output data and/or behavior 150. In various embodiments, execution environment 140 may include a physical computer system, a virtual machine, a software environment, support libraries, and/or various other components usable to execute code 130, either directly or by interpretation.

In different circumstances, output/behavior 150 may include data stored in various levels of system memory (e.g., in-memory objects and/or data structures), on persistent storage (e.g., files on a file system), etc. Behavior 150 may also include various program functionalities, such as displaying output on a screen, sending messages over a network, and/or otherwise interacting with various users and/or components.

Figure 2:
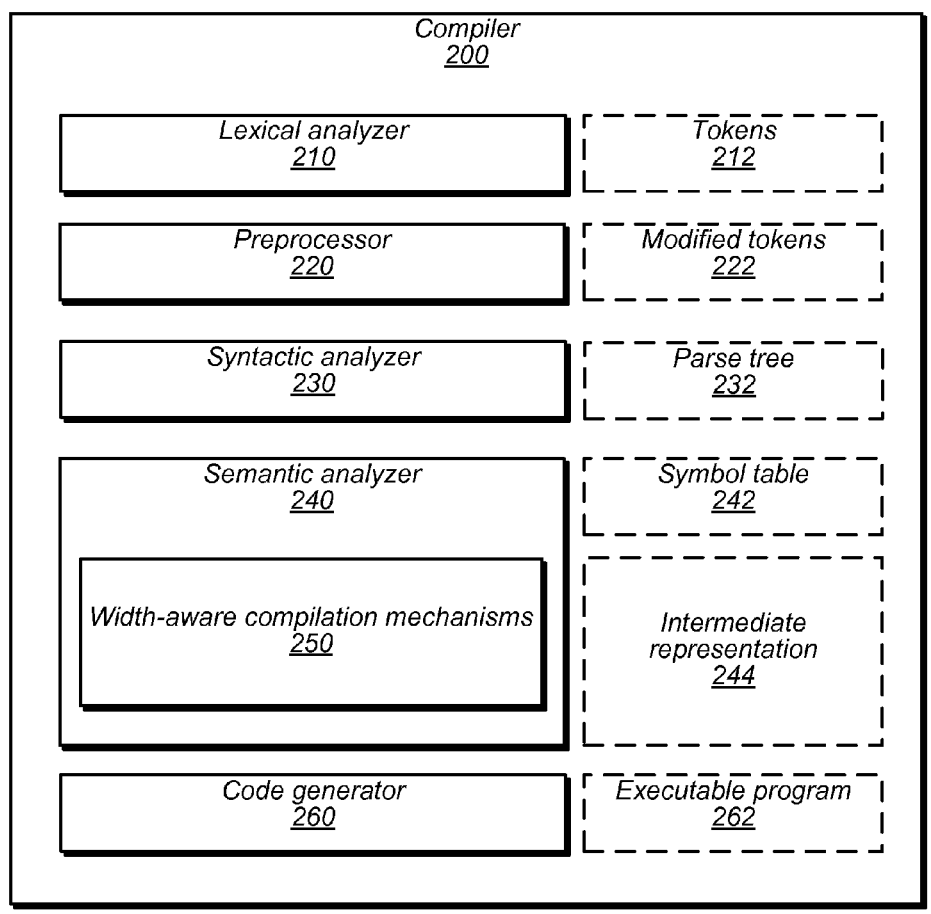
FIG. 2 is a block diagram illustrating the components of a width-aware compiler configured to implement various methods/systems described herein.

FIG. 2 is a block diagram illustrating the components of a width-aware compiler configured to implement various methods/systems described herein. According to various embodiments, the compiler may be implemented in software and executed by a computer system on given source code, such as source code 110. As in FIG. 1, solid outlines in FIG. 2 indicate functional components while dashed lines indicate data structures passed among the functional components.

Compiler 200 represents just one possible example of a width-aware compiler. In other embodiments, the compiler may include fewer, additional, and/or various other components not pictured in FIG. 2. It is intended that this disclosure cover all such embodiments wherein a compiler is configured to create a width-specific executable program (or component) based on a target machine width.

According to the illustrated embodiment, width-aware compiler 200 includes lexical analyzer 210, which may be configured to break the input source code into tokens, such as tokens 212. Each token 212 may correspond to a single atomic unit of the given language, such as keywords, identifiers, etc. In various embodiments, the token syntax may be represented as a regular language.

According to the illustrated embodiment, compiler 200 may include preprocessor 220, which may be used to support macro substitution in some languages. In some embodiments, preprocessor 220 may modify various ones of tokens 212, which may result in a set of modified tokens, such as 222.

Compiler 200 also includes syntactic analyzer 230, which may be configured to parse the modified tokens 222 to identify syntactic structure of the input program. The syntactic analyzer may be configured to build a parse tree, such as parse tree 232, which may organize the tokens of 222 into a tree structure according to the formal grammar of the programming language of the source code.

Compiler 200 further includes a semantic analyzer 240, which may be configured to add semantic information to parse tree 232 to create an annotated internal representation of the program, such as intermediate representation 244. In some embodiments, semantic analyzer 240 may also build and/or maintain a symbol table, such as symbol table 242, which maps various symbols in the source code to associated information, such as the location, scope, and/or type. Semantic analyzer 240 may include various width-aware compilation mechanisms (e.g., 250) configured to generate an intermediate representation that targets a given vector width. For example, as described herein, the width-aware compilation mechanisms may be configured to determine the machine's vector width, choose between multiple width-specific functions, produce code that elides various synchronization primitives based on the vector width, and produce code that enforces various concurrency guarantees.

In some embodiments, a code generator, such as code generator 260, may convert the intermediate representation 244 into an executable program, such as 262. Executable program 262 may be encoded in binary, byte code, and/or in another representation and may correspond to executable code 230 in FIG. 2.

In various embodiments, different components of compiler 200 may be combined or further deconstructed into multiple components. The compiler may implement additional or fewer functions, width-aware compilation mechanisms may be implemented by various components and/or even by different compilers. For example, with Just-In-Time (JIT) compilation, a compiler may create an intermediate representation (e.g., 244) that it (or another compiler) may later manipulate into different executable programs (e.g., 262) depending on runtime conditions.

Figure 3:
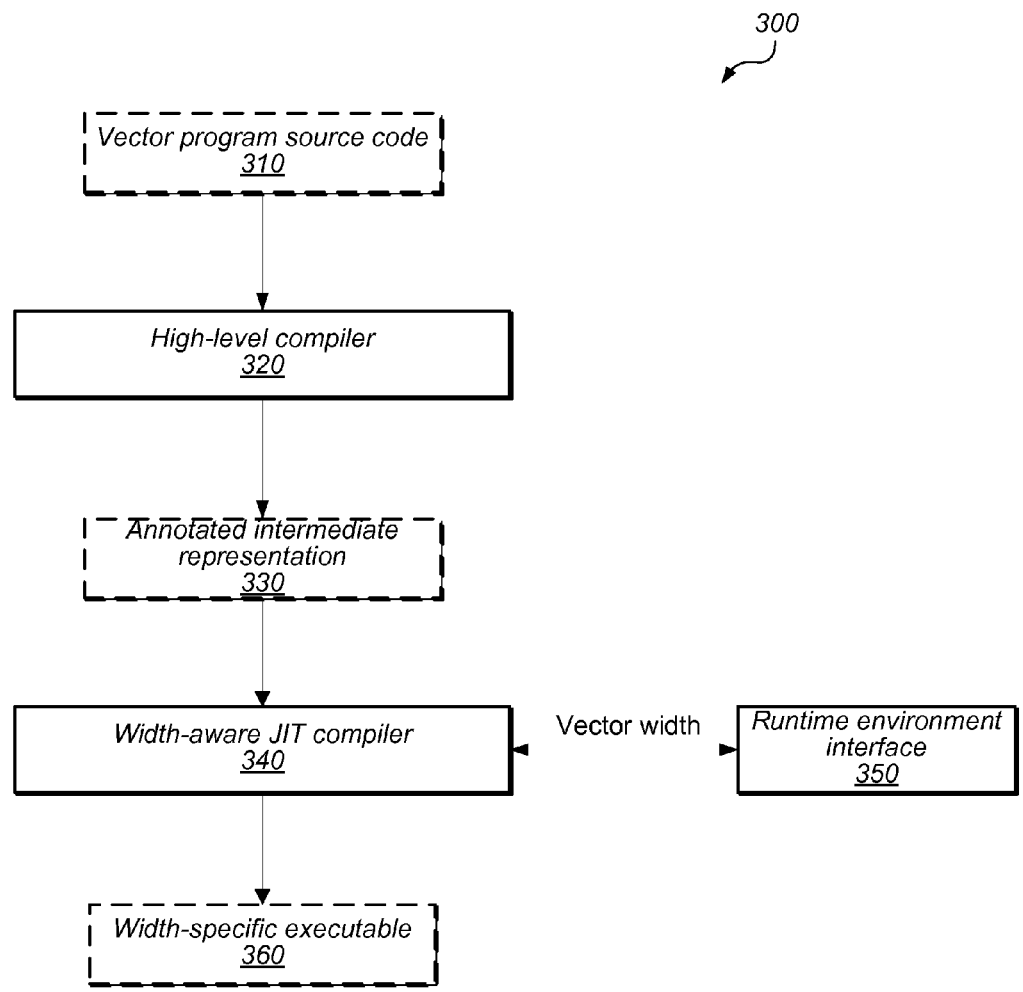
FIG. 3 is a flow diagram illustrating a method for performing width-aware compilation using JIT compilation.

FIG. 3 is a flow diagram illustrating a method for performing width-aware compilation using JIT compilation. In various embodiments, method 300 may be performed by one or more compilers and/or compiler components. As in FIG. 1, data is denoted by dashed outlines and components by solid lines.

Method 300 begins when a high-level compiler 320 receives vector program source code 310. Vector program source code 310 may be specified in a high-level language and be marked with various width-aware compilation hints, as described in more detail below. In some embodiments, vector program source code 310 may correspond to vector program source code 110 of FIG. 1.

High-level compiler 320 may compile vector program source code 310 into an annotated intermediate representation, such as 330. In various embodiments, intermediate representation 330 may be encoded using an intermediate language (e.g., byte code) or using an intermediate in-memory representation (e.g., annotated parse tree or other data structure). The annotated intermediate representation 330 may include hints and/or instructions for use by a width-aware JIT compiler, such as 340. For example, if the vector program 310 includes a function call that can be mapped to different implementations, each of which is optimized for a different respective vector width, the high-level compiler 320 may mark the function as width-overloaded in the intermediate representation 330. When a JIT compiler attempts to compile the annotated intermediate representation, the JIT compiler may detect that the function is overloaded and select the appropriate implementation for the vector width.

In some embodiments, a width-aware JIT compiler (such as 340) may become aware of a target machine's vector width in different ways. For example, in some embodiments, the JIT compiler may read the vector width from a configuration file. In some embodiments, the JIT compiler may query an interface for the vector width. Such an interface may be a programmatic interface exposed to the compiler via an operating system, support library, and/or by any runtime environment component. In the illustrated embodiment, such possibilities are embodied in runtime environment interface 350.

In the illustrated embodiment, width-aware JIT compiler 340 uses the vector width discovered from interface 350 to convert annotated intermediate representation 330 into width-specific executable 360. Width-specific executable 360 may include function calls to functions optimized for the target machine's vector width, may omit synchronization operations that are superfluous in light of that vector width, and/or may guarantee various concurrent behavior.

It should be noted that in various embodiments, width-aware JIT compiler 340 may recompile intermediate representation 330 multiple times in response to runtime conditions in order to achieve different levels of optimization. Accordingly, JIT compiler 340 may create multiple different width-specific executables from intermediate representation 330. In various embodiments, high-level compiler 320 and JIT compiler 340 may be different parts of the same compiler, two separate compilers, and/or two separate compilers on two separate systems.

As noted briefly above, a compiler may create a width-specific executable by selecting an appropriate version of a given function, by creating code that enforces certain guarantees within the target vector width, by eliding unneeded synchronization, and/or by performing other functions. Each of these three examples is treated in detail below. However, variations on these themes may be possible and are covered by this disclosure.

In some embodiments, a programmer may request function selection by marking a function call in a vector program as width-overloaded. In response to detecting the request the compiler(s) may automatically select the appropriate implementation that corresponds to the target machine's vector width. Such a method may permit the programmer to optimize different functions for different vector widths and to have the compiler choose the optimal function. In some embodiments, the programmer may mark the function as width-overloaded with predefined notation (e.g., call myFunction.selectWidth( )).

Figure 4:
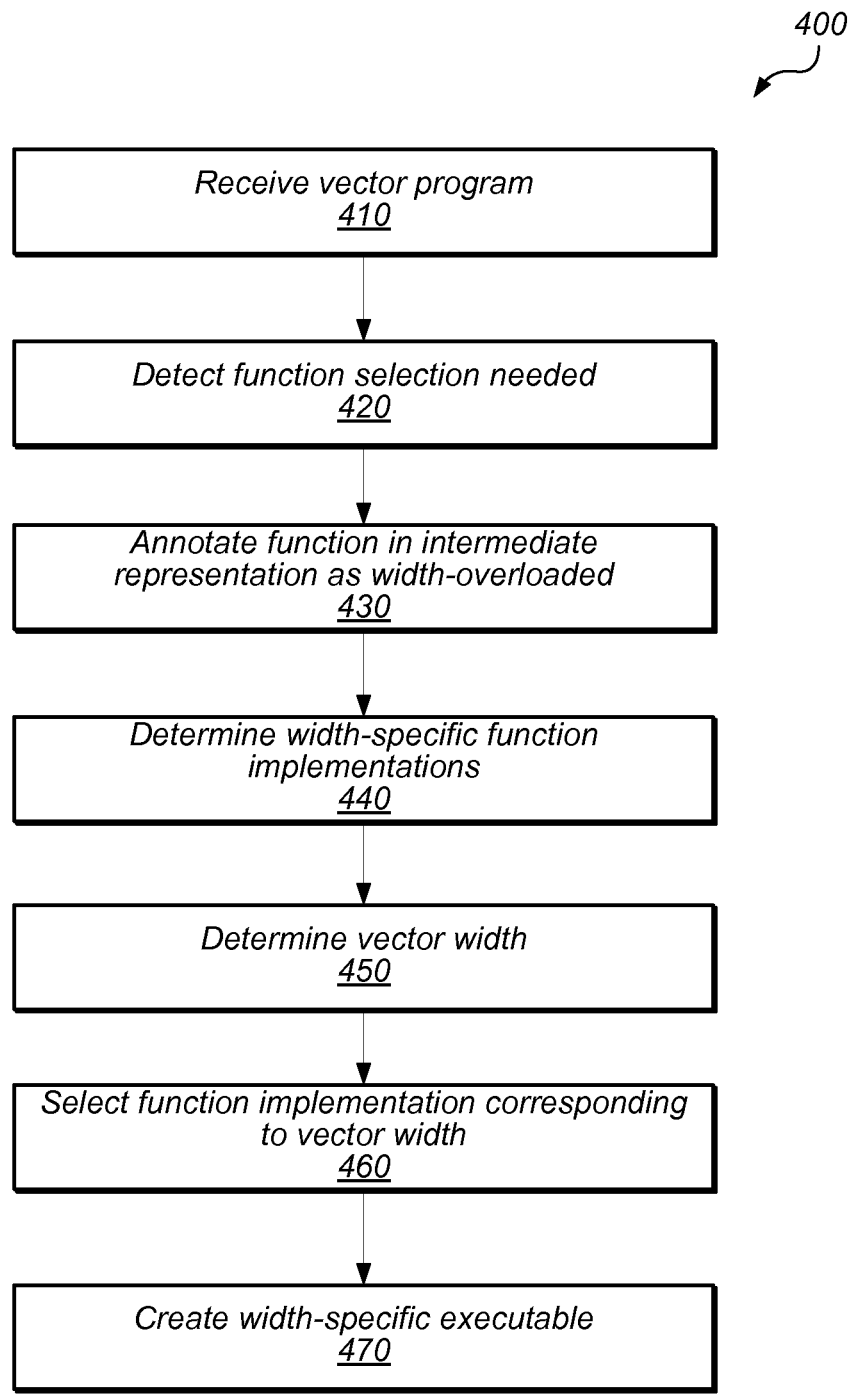
FIG. 4 is a flow diagram illustrating a method for automatic function selection based on vector width, according to some embodiments.

FIG. 4 is a flow diagram illustrating a method for automatic function selection based on vector width, according to some embodiments. The illustrated method may be implemented by one or more compilers, such as 120, 200, 320, and/or 340.

Method 400 begins when the compiler receives a vector program, as in 410. The vector program may be specified in one or more vector-programming languages that utilize a vector-programming model.

In 420, the compiler detects that function selection is needed. In some embodiments, the compiler may detect the function-selection need in response to detecting a program directive, which may be denoted using special notation (e.g., "myFunction.selectWidth," etc.). In some embodiments, the compiler may automatically infer that a width-specific implementation should be selected based on the availability of different implementations. For example, if two versions of a function are available and marked with special notation (e.g., myFunction.32 and myFunction.64), the compiler may automatically swap out a call to one function for a call to another when the vector width is appropriate. Various other possibilities exist.

In 430, the compiler responds to detecting that function selection is needed by annotating the intermediate representation as width-overloaded. As discussed above, the intermediate representation may be encoded in an intermediate language (e.g., byte code) or by any number of in-memory data structures.

In 440, the compiler determines a plurality of width-specific function implementations for the width-overloaded function. For example, in some embodiments, the programmer of a library may write a set of functions that are optimized for different widths. In another embodiment, the compiler itself can generate a set of functions at compile time for different vector widths.

In 450, the compiler determines the width of the target machine. In some embodiments, the target width may be provided to the compiler using configuration information. For example, the compiler may receive the width via a compilation flag and/or via a configuration file. In other embodiments, the compiler may use a programmatic interface (API) of the runtime environment to query for the vector width of the machine.

In 460, the compiler selects the appropriate function implementation from among those determined in 440. In various embodiments, the programmer may use different notation to inform the compiler of which function implementations correspond to which vector lengths. For example, in some embodiments, the target vector width for each function may be denoted as a suffix of the function name (e.g., myFunction.32, myFunction.64, etc.). Many other notations are possible, such as a compiler directive preceding the function definition (e.g., #WIDTH=64), and it is intended that this disclosure pertain to all such possibilities.

In 470, the compiler creates a width-specific executable. The width-specific executable includes the function call to the width-specific implementation selected in 460. Thus, the width-specific executable is optimized to execute on the target machine.

In some embodiments, a single compiler may execute method 400 before runtime. However, in other embodiments, a high-level compiler may create the annotated intermediate representation by executing steps 410-430, and a width-aware JIT compiler may dynamically determine the vector width at runtime and create the width-specific executable by executing steps 440-470. In some embodiments, the high-level and width-aware JIT compilers may be implemented as different functions of the same compiler.

In some embodiments, a programmer may request that the compiler enforce various concurrency guarantees. For example, the programmer may mark a function to request that on entry to that function, if any work item in a work group enters, all work items in that work group must enter. A program may require such guarantees to ensure that different work items maintain a consistent memory state.

Consider for example, a pseudo-random number generator that stores some amount of state. The more state that is stored, the larger the theoretical number of random numbers it could generate before beginning to repeat the pseudo-random pattern (i.e., larger cycle). Therefore, one approach to increasing the state size is to share state across multiple work items of the vector (e.g., 32 work items) and therefore have a larger state pool and consequently larger cycle. However, if one work item updates only its part of the state pool, then the generator may malfunction. Therefore it may be important that if any work item executes a function that updates state, all work items cooperating to implement the pseudo-random number generator do so together.

Although, correctness may require that a given function executed by one work item must be executed by all N work items, some programming models can make it difficult to express this requirement (e.g., a model in which a SIMD vector is programmed in lane-wise fashion). For example, a function that modifies the collective state may be inside a conditional that is resolved differently across work items. Suppose for example that myFunction is a function that modifies the pseudo-random number generator's state and the vector program includes the following pseudo-code: if (get_local_id(0)% 2==0){call myFunction }. In this example, only work items whose id is even numbered enter the conditional and invoke myFunction. Consequently, the pseudo-random number generator's state would be corrupted because correctness requires that all work items execute this function.

In some embodiment, a programmer may mark a function call in such a way as to request that the compiler guarantee that if any of N work items execute the function, then all N work items execute the function. For example, the programmer may use notation such as "myFunction.requires32" to denote that at minimum, 32 work items must execute the function if any work item does.

Figure 5:
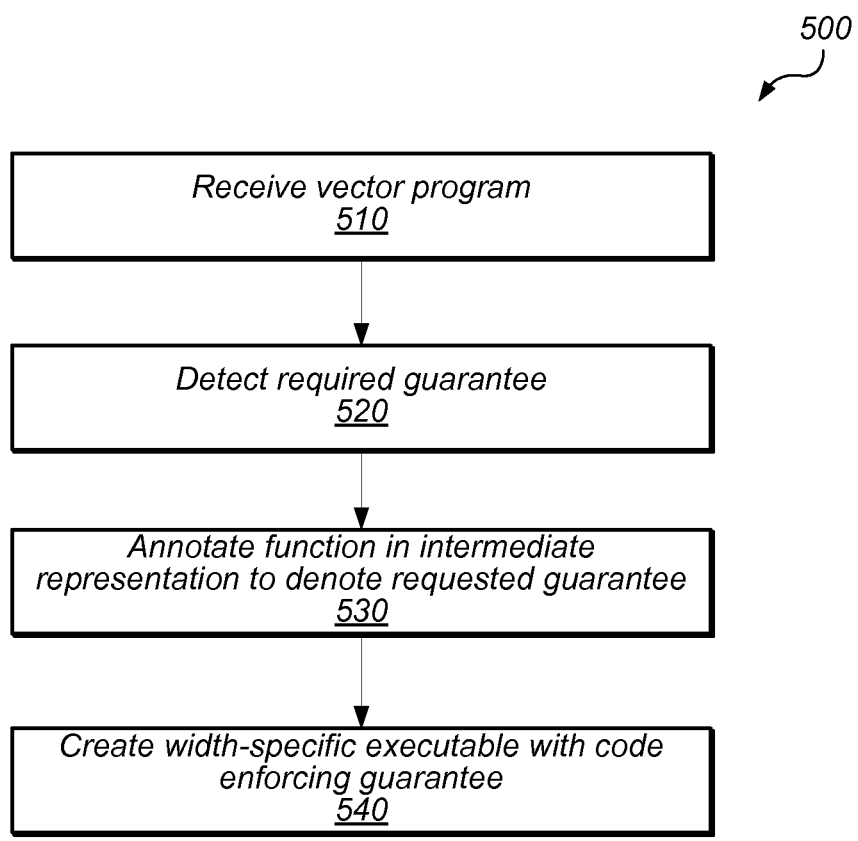
FIG. 5 is a flow diagram illustrating a method for a compiler enforcing various concurrency guarantees, according to some embodiments.

FIG. 5 is a flow diagram illustrating a method for a compiler enforcing various concurrency guarantees, according to some embodiments. Method 500 may be executed by a compiler, such as 120, 200, 320, and/or 340.

In 510, the compiler receives a vector program that includes a request for a given guarantee. As before, the vector program may be specified in one or more vector-programming languages that utilize a vector-programming model. In various embodiments, the guarantee may be requested in different ways. For example, the programmer may specify the required guarantee using a suffix to the function call (e.g., myFunction.requires32 might denote that the function requires that at least 32 work items execute the function). In other embodiments, a function may be marked by a compiler hint (e.g., #requires32) and/or by any other notation indicating a requested guarantee (e.g., minimum number of work items required).

In 520, the compiler detects the notation indicating the requested guarantee by parsing the vector program received in 510.

In 530, the compiler marks the intermediate representation with the requested guarantee. In some embodiments, the compiler may insert additional code into the intermediate representation to implement the guarantee, but in other embodiments, the compiler may simply mark the intermediate representation to denote the guarantee without inserting code to implement it.

In 540, the compiler creates an executable that enforces the requested guarantee.

To illustrate method 500, consider the pseudo-random number generator example above. Recall that myFunction is a function that modifies the shared state and must therefore be executed by all 32 work items. However, the program code if (get local id(0)% 2==0){call myFunction} results in only half of the work items executing myFunction, which corrupts the shared state.

According to some embodiments, the programmer may correct this situation by instructing the compiler to guarantee that if any work item executes the myFunction call, at least 32 work items do. For example, the programmer may mark the myFunction interface with an indication of how many work items are needed (e.g., naming the function myFunction.requres32). In another embodiment, the programmer may tag the function definition with a compiler hint, such as #requires32.

In response to detecting that myFunction requires 32 work items, the compiler (e.g., JIT compiler) may generate code (e.g., in 540) that enforces that guarantee. For example, a SIMD system may potentially execute a function within a conditional (e.g., if (get_local_id(0)% 2==0){call myFunction }) by creating a vector mask upon entry into the function, where the vector mask enables only the lanes for which the condition is true. To guarantee that more vectors execute the function, the compiler may include code within the executable to manipulate such a vector mask. For example, to guarantee that 32 lanes execute the myFunction code, the compiler may replace the original myFunction code with:

```
(1) myFunction.requires32:
(2)    push mask
(3)    mask = mask | (2<<32)−1
(4)    ...original function code...
(5)    pop mask
```

By manipulating the vector mask, the compiler may unmask all lanes and therefore guarantee that if any lane executes the function, all 32 do.

In some embodiments, a programmer may request that a given function call only be executed if the vector width is below (or above) a certain threshold. In response to detecting such a request and the target machine's vector width, the compiler may elide the function call when appropriate by omitting it from the final executable code. Such a function call, whose invocation is contingent on a target machine's vector width, may be referred to herein as width-contingent.

A compiler with width-contingent capabilities may enable a programmer to create efficient, portable code. For example, the compiler may automatically elide various synchronization operations that may only be necessary when a machine's vector width is below a given threshold. Consider for example, a barrier operation, which is a synchronization primitive that instructs a thread to pause execution until all other threads reach the same point of execution. Such operations introduce significant performance overhead and are often unnecessary when a machine's vector-width is greater than the number of work items. However, because the programmer may not know the vector width of each target machine, he may include barrier operations that are only necessary when the program executes on machines with shorter vector widths, but not on other machines with wider vectors.

Consider the following vector-code example:

```
#define WAVE_SIZE 32
uint scanwave(uint val, volatile __local uint* sData, int maxlevel)
{
    int localId = get_local_id(0);
    int idx = 2 * localId − (localId & (WAVE_SIZE − 1));
    sData[idx] = 0;
    idx += WAVE_SIZE;
    sData[idx] = val;
    if (0 <= maxlevel) { sData[idx] += sData[idx − 1]; }
        barrier( );
    if (1 <= maxlevel) { sData[idx] += sData[idx − 2]; }
        barrier( );
    if (2 <= maxlevel) { sData[idx] += sData[idx − 4]; }
        barrier( );
    if (3 <= maxlevel) { sData[idx] += sData[idx − 8]; }
        barrier( );
    if (4 <= maxlevel) { sData[idx] += sData[idx −16]; }
        barrier( );
    return sData[idx] − val;
}
```

In this example, the programmer has inserted a barrier operation after each access to the shared data array sData[ ] to ensure the code is portable to machines with short vector widths. However, such barrier operations are only necessary in this program when the machine's vector width is less than or equal to 2^maxLevel. Therefore, on a machine with a 64-wide vector width, the above code would execute give superfluous barrier operations.

According to various embodiments, a programmer may mark a function call with an indication of the minimum vector width necessary before a compiler may elide the function call. Accordingly, when a width-aware compiler compiles the code, it may elide those function calls that are superfluous in light of the target machine's vector width.

A compiler with width-contingent capabilities may enable a programmer to rewrite the code example above as follows:

```
#define WAVE_SIZE 32
uint scanwave(uint val, volatile __local uint* sData, int maxlevel)
{
    int localId = get_local_id(0);
```

-continued

```
    int idx = 2 * localId - (localId & (WAVE_SIZE - 1));
    sData[idx] = 0;
    idx += WAVE_SIZE;
    sData[idx] = val;
    if (0 <= maxlevel) { sData[idx] += sData[idx - 1]; }
        barrier(2);
    if (1 <= maxlevel) { sData[idx] += sData[idx - 2]; }
        barrier(4);
    if (2 <= maxlevel) { sData[idx] += sData[idx - 4]; }
        barrier(8);
    if (3 <= maxlevel) { sData[idx] += sData[idx - 8]; }
        barrier(16);
    if (4 <= maxlevel) { sData[idx] += sData[idx -16]; }
        barrier(32);
    return sData[idx] - val;
}
```

In the re-written example, each barrier function call is marked with a minimum vector width under which the barrier operation may be removed. For example, the function call barrier(8) indicates that a compiler that targets a machine with vector width 8 or more may elide that barrier operation. Therefore, if a width-aware compiler targets a 16-wide machine, only the last two barrier operations (barrier(16) and barrier(32)) may be necessary and the compiler may elide the first three.

Figure 6:
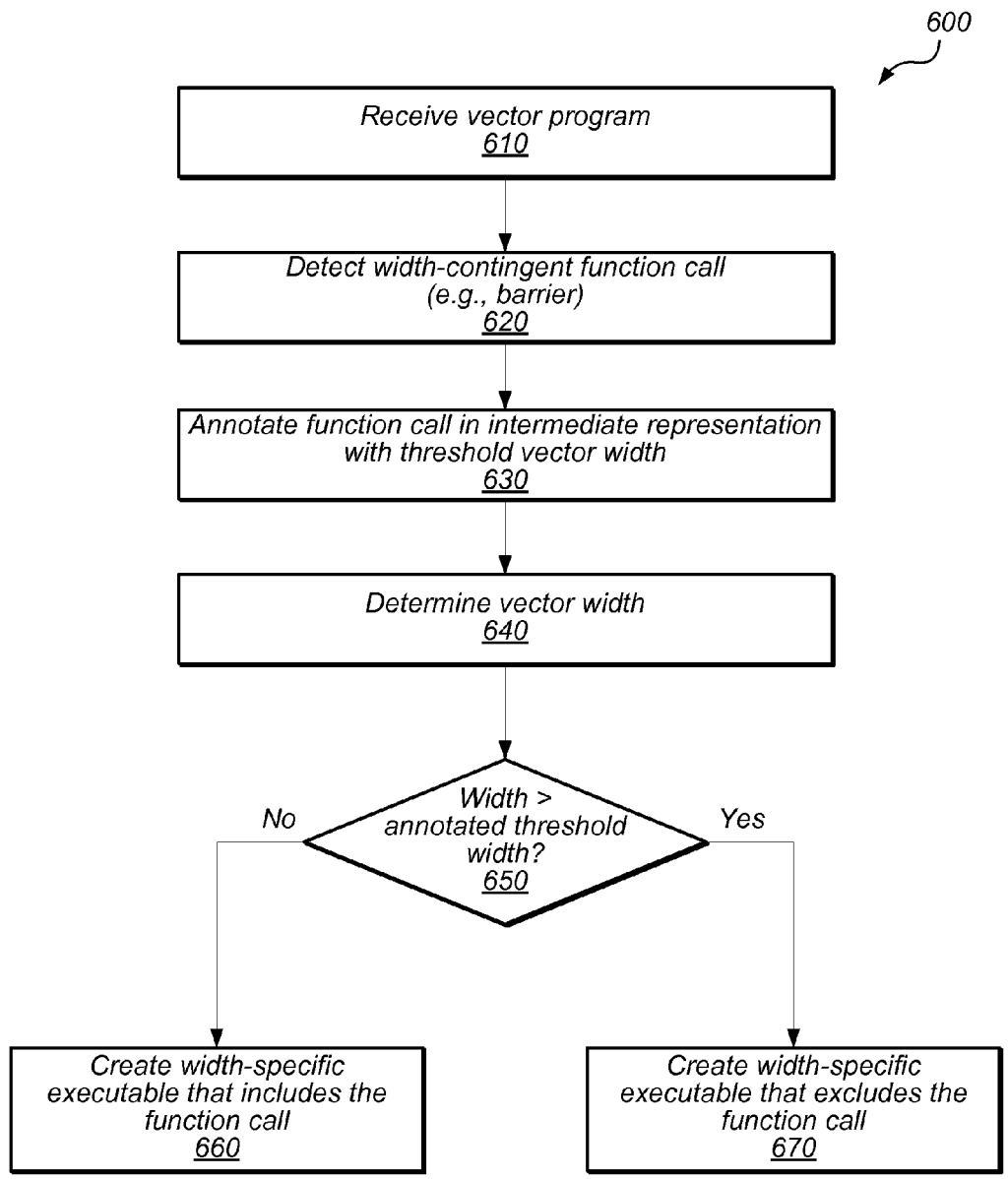
FIG. 6 is a flow diagram illustrating a method for implementing width-contingent function calls, according to some embodiments.

FIG. 6 is a flow diagram illustrating a method for implementing width-contingent function calls, according to some embodiments. The illustrated method may be implemented by one or more compilers, such as 120, 200, 320, and/or 340.

Method 600 begins when the compiler receives a vector program, as in 610, which may be specified in one or more vector-programming languages utilizing the vector-programming model.

In 620, the compiler detects that a given function call is width-contingent. The given function may correspond to a synchronization primitive (e.g., barrier operation) or to any other function call. The width-contingency may be indicated using various syntax (e.g., barrier(32), barrier.32, etc.), which may vary across embodiments. In some embodiments, the syntax may indicate the minimum vector width necessary to elide the function call.

In 630, the high-level compiler creates an intermediate representation of the program and annotates the function call to indicate the minimum vector length. As discussed above, such an intermediate representation may be encoded in an intermediate language or by any number of in-memory data structures.

In 640, the compiler determines the width of the target machine. In various embodiments, the target width may be provided to the compiler using configuration information (e.g., compilation flag), using a programmatic interface, and/or by other means.

In 650, the compiler determines whether the vector width determined in 640 is greater than the annotated width specified by the programmer. If the vector width is greater than the required width, as indicated by the affirmative exit from 650, the compiler may elide the function call by creating a width-specific executable that excludes the function call, as in 670. Alternatively, if the vector width is not greater than the required width, as indicated by the negative exit from 650, the compiler may create a width-specific executable that includes the function call, as in 660.

In some embodiments, a single compiler may execute method 600 before runtime, but in other embodiments, multiple compilers may collaborate to create the executable. For example, a high-level compiler may create the annotated intermediate representation by executing steps 610-630, and a width-aware low-level compiler (e.g., JIT compiler) may create the ultimate width-specific executable by executing steps 640-670. As before, in some embodiments, the high-level and low-level compiler functions may be integrated into the same compiler.

Although the embodiments above describe function elision as implemented by a width-aware compiler, in other embodiments, function elision may be implemented automatically in hardware. In such implementations, vector system hardware may automatically detect and elide superfluous function calls when the machine's vector width exceeds that specified by the programmer, even when the compiler has included the function call in the final executable. For example, the hardware may determine that the function call is superfluous during execution of the function call itself. In one such example, a decoder unit may include logic that compares the system's vector width to the width specified by the instruction; if the system's vector width is larger, then the hardware may elide the function call by dropping the function invocation. In other embodiments, the hardware may detect that a function call is superfluous at other stages of the execution pipeline.

Figure 7:
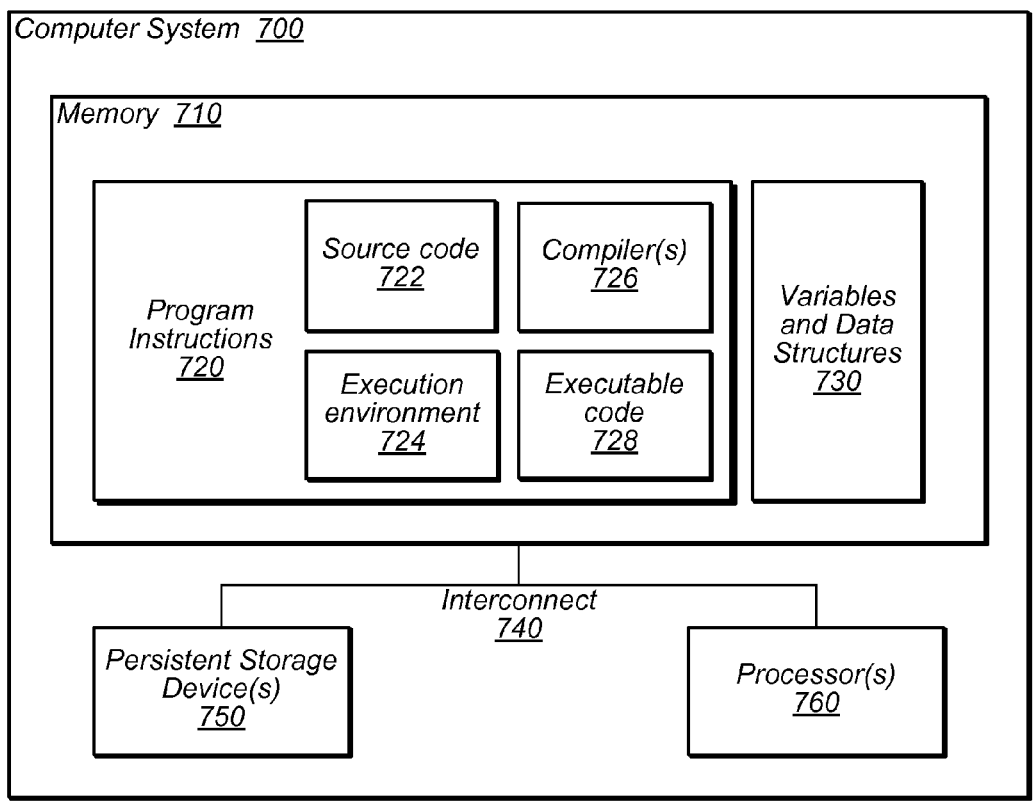
FIG. 7 is a block diagram illustrating a computer system configured to implement width-aware compilation as described herein, according to various embodiments.

FIG. 7 is a block diagram illustrating a computer system configured to implement width-aware compilation as described herein, according to various embodiments. The computer system 700 may correspond to any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The compiler components, source code, and/or code to execute various compilation methods described herein may be provided as a computer program product, or software, that may include a computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. The program instructions may be stored in a non-transitory storage medium (e.g., computer memory, CD-ROM, etc.) or may be communicated in a transitory manner, such as by using optical, acoustical or other form of propagated signal (e.g., carrier waves, infrared signals, digital signals, etc.)

A computer system 700 may include one or more processors 760, each of which may include multiple cores, any of which may be single or multi-threaded. The computer system 700 may also include one or more persistent storage devices 750 (e.g. optical storage, magnetic storage, hard drive, tape drive, solid state memory, etc), which may persistently store, for example, data such as program source code 110, width-specific executable code 130, and/or various outputs 150 as shown in FIG. 1.

According to the illustrated embodiment, computer system 700 may include one or more memories 710 (e.g., one or more of cache, SRAM, DRAM, RDRAM, EDO RAM, DDR 10 RAM, SDRAM, Rambus RAM, EEPROM, etc.). The one or more processors 760, the storage device(s) 750, and the system memory 710 may be coupled to an interconnect 740. Various embodiments may include fewer or additional components not illustrated in FIG. 7 (e.g., video cards, audio cards, additional network interfaces, peripheral devices, a network interface such as an ATM interface, an Ethernet interface, a Frame Relay interface, monitors, keyboards, speakers, etc.).

One or more of the system memories 710 may contain program instructions 720. Program instructions 720 may be encoded in platform native binary, any interpreted language such as byte-code, or in any other language such as C/C++, OpenCL, etc. or in any combination thereof. Program instructions 720 may include various source code 722, for one or more applications, which may be compiled into executable code 728 by compiler(s) 726. In various embodiments, source code 722 may include compiler hints, such as function-selection, function-elision, and/or concurrency guarantees, as discussed herein.

In some embodiments, compilers 726 may correspond to any of compilers 120, 200, 320, and/or 340. Such compilers may include high-level, low-level, and/or JIT compilers, any of which may be combined. Compiler(s) 726 may be configured to perform width-aware compilation, as described herein, such as function-selection, function-elision, and/or enforcing concurrency guarantees. In some embodiments, executable code 728 may correspond to width-specific executable code, such as 130, 262, and/or 360. Such code may be encoded in an interpreted language, a native binary language specific to computer system 700, and/or in various other executable language formats.

In some embodiments, program instructions 720 may further comprise one or more execution environments, such as 724, for executing executable code 728 on computer system 700. Execution environment 724 may correspond to an operating system, virtual machine various software containers, software libraries, interpreters, and/or other software infrastructure necessary for executing executable code 728.

In some embodiments, memory 710 may include any number of in-memory variables and data structures, such as 730. Variables and data structures may comprise compiler data structures, as shown in FIG. 2, which may include indications of variables declared and/or objects initialized in source code 722. In some embodiments, variables and data structures 730 may include in-memory objects allocated by execution environment 724 in response to executing executable code 728. Such in-memory objects may include variables and/or data structures, such as arrays, vectors, matrices, and/or other vector programming constructs.

A computer-readable storage medium as described above may be used in some embodiments to store instructions read by a program and used, directly or indirectly, to fabricate hardware comprising one or more of processors 760. For example, the instructions may describe one or more data structures describing a behavioral-level or register-transfer level (RTL) description of the hardware functionality in a high level design language (HDL) such as Verilog or VHDL. The description may be read by a synthesis tool, which may synthesize the description to produce a netlist. The netlist may comprise a set of gates (e.g., defined in a synthesis library), which represent the functionality of processor 500. The netlist may then be placed and routed to produce a data set describing geometric shapes to be applied to masks. The masks may then be used in various semiconductor fabrication steps to produce a semiconductor circuit or circuits corresponding to processors 760. Alternatively, the database may be the netlist (with or without the synthesis library) or the data set, as desired.

Various executable software applications that are created according to width-aware compilation techniques disclosed herein may be optimized to execute on multiple different platforms having different processor widths. Such optimized applications may execute optimally by taking different optimized paths through the code according to the vector width of the execution environment.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer-readable storage medium storing program instructions executable by a computer to implement a compiler configured to:
   receive program code that specifies a barrier operation, wherein the barrier operation synchronizes execution of a plurality of work items, by pausing execution of one of the plurality of work items until others of the plurality of work items reach a same execution point;
   create a width-specific executable version of the program code, wherein creating the width-specific executable version comprises:
      determining a vector width of a target computer system, wherein the vector width is a number of work items that the target computer system is configured to execute in parallel; and
      in response to the determined vector width meeting one or more criteria, omitting the barrier operation from the width-specific executable version.

2. The medium of claim 1, wherein the program code specifies that the barrier operation is to be omitted in response to the vector width of the target computer system meeting the one or more criteria.

3. The medium of claim 1, wherein the one or more criteria include a minimum vector-width for including the barrier operation in the width-specific executable.

4. The medium of claim 3, wherein the program code specifies the minimum vector width.

5. The medium of claim 1, wherein the compiler is a just-in-time compiler configured to create the width-specific executable version at runtime.

6. The medium of claim 1, wherein the compiler is configured to determine the vector width by querying a programmatic interface exposed by a runtime environment.

7. The medium of claim 1, wherein the compiler is configured to determine the vector width by receiving an indication of the width through configuration information.

8. A computer-implemented method of compiling program code, the method comprising:
analyzing program code that includes a function call for a synchronization operation of a plurality of work items, wherein the synchronization operation halts execution for ones of the plurality of work items until others of the plurality of work items reach a same point of execution;
producing a width-specific executable version of the program code, wherein producing the width-specific executable version comprises:
in response to a vector width of a target computer system satisfying a threshold indicated, eliding the function call from the width-specific executable version, wherein the vector width is a number of work items that the target computer system is configured to execute concurrently.

9. The method of claim 8, wherein the program code identifies the function call as a candidate for being elided.

10. The method of claim 8, further comprising:
compiling the program code with a just-in-time compiler such that the width-specific executable version is produced at program runtime.

11. The method of claim 8, wherein the producing comprises determining the vector width by querying a programmatic interface exposed by a runtime environment.

12. The method of claim 8, wherein the producing comprises determining the vector width by receiving an indication of the width through configuration information.

13. An apparatus, comprising:
a memory having a computer program stored therein;
a vector processor configured to elide a function call in the computer program in response to determining that the function call is superfluous, wherein determining that the function call is superfluous is based on a vector width of the vector processor, wherein the vector width is a number of work items that the vector processor is configured to execute in parallel, and wherein the function call is for a barrier operation to synchronize execution of a plurality of work items, by suspending execution of one of the plurality of work items until others of the plurality of work items reach a similar point in execution.

14. The apparatus of claim 13, wherein the vector processor is configured to elide the function call at runtime.

15. The apparatus of claim 13, wherein determining that the function call is superfluous comprises determining that the vector width satisfies a minimum vector width.

16. The apparatus of claim 15, wherein the minimum vector width is indicated by the function call.

* * * * *